United States Patent [19]
Schmitt et al.
[11] 4,156,589
[45] May 29, 1979

[54] EQUALIZING PLATE FOR A VULCANIZING PRESS OR OTHER SUCH PRESS

[75] Inventors: Wilhelm Schmitt, Heppenheim-Erbach; Rolf Halblaub, Hemsbach, both of Fed. Rep. of Germany

[73] Assignee: Firma Carl Freudenberg, Weinheim, Fed. Rep. of Germany

[21] Appl. No.: 902,189

[22] Filed: May 2, 1978

[30] Foreign Application Priority Data

May 27, 1977 [DE] Fed. Rep. of Germany ....... 2724056

[51] Int. Cl.[2] ........................ B30B 15/00; B30B 5/02; B29C 1/00

[52] U.S. Cl. .................................... 425/472; 100/211; 425/389; 425/469

[58] Field of Search ................ 156/580, 583; 264/313, 264/314; 425/DIG. 19, 405, 407, 411, 409, 469, 383, 384, 389, 390; 249/78; 100/93 P, 211, 53

[56] References Cited

U.S. PATENT DOCUMENTS

| | | | |
|---|---|---|---|
| 2,311,358 | 2/1943 | Baily | 425/417 |
| 2,410,857 | 11/1946 | Ahern | 425/389 |
| 2,646,105 | 7/1953 | Langer | 100/93 P |
| 3,251,908 | 5/1966 | Wilenius et al. | 425/405 |
| 3,255,476 | 6/1966 | Dawson | 100/211 |
| 3,358,335 | 12/1967 | Ralphs et al. | 425/DIG. 19 |
| 3,434,910 | 3/1969 | Kannegiesser et al. | 100/211 |
| 3,452,376 | 7/1969 | Ito | 425/384 |
| 3,522,133 | 7/1970 | Gross | 156/583 |
| 3,901,640 | 8/1975 | Tigner et al. | 425/DIG. 14 |

*Primary Examiner*—W. E. Hoag
*Attorney, Agent, or Firm*—Sprung, Felfe, Horn, Lynch & Kramer

[57] ABSTRACT

An equalizing plate for use in a vulcanizing press or the like comprises a base plate, a top plate and a low-melting point metal alloy hermetically sealed therebetween. The two plates are flexibly joined at their periphery and at least one of the plates has a membrane-like transition in the outer periphery thereof having at least one single U-shaped profile whose axis of symmetry is perpendicular to the surface of the equalizing plate.

9 Claims, 6 Drawing Figures

EQUALIZING PLATE FOR A VULCANIZING PRESS OR OTHER SUCH PRESS

BACKGROUND

The invention relates to an equalizing plate or platen for a vulcanizing press or other such presses, consisting of a top plate and a bottom plate which are joined flexibily together at their outer periphery and in the space between which a low-melting point metal alloy is hermetically sealed.

An equalizing plate of this kind is described in FR-PS 1,592,833. The equalizing plate consists of a pair of approximately parallel, continuous plates which are joined together at their margin. The inner space between the two plates is filled with a fluid metal alloy, and the object of using such an equalizing plate is a better transfer of heat to the material being vulcanized. Another purpose consists of achieving a uniform distribution of the pressure applied by the press plates.

Equalizing plates of this kind have not found widespread practical use, because, after only a short time in service, unacceptable deformations have appeared in the flexible plates. Furthermore, due to the frequent temperature fluctuations produced by operating conditions, considerable internal stresses are produced which in critical situations could result in fracture in the area where the two plates are joined together.

THE INVENTION

The invention is addressed to the problem of modifying a plate of this kind such that deformations will not occur in the surfaces. Assurance is also to be provided that the area where the upper part and lower part are joined together will be free of internal stresses under normal operating conditions.

This problem is solved by the invention in a plate of the kind described above, in that in the area of the outer periphery of the top and/or bottom plate, a membrane-like transition is provided having an at least single U-shaped profile whose axis of symmetry is perpendicular to the surface of the equalizing plate. By this special construction of the equalizing plate of the invention, the possibility of virtually unlimited movement is provided for every individual area thereof. The dimensional changes occurring as a result of temperature fluctuations are consequently never transmitted from one area to the others. The dimensional changes are consequently reversible. Permanent deformations which would result in a limitation of useful life do not occur.

In a special development, provision is made for the top plate and/or the bottom plate to be of inflexible and stiff construction. An equalizing plate of this kind is characterized by an extraordinary resistance to mechanical damage. The parts of inflexible and stiff construction can have a greater thickness, and this provides the possibility of joining adjacent machine parts to the equalizing plate in an especially simple manner, for example by bolting or by welding.

Another advantage is that the parts of inflexible and stiff construction can consist of any desired material, such as a steel having a low thermal coefficient of expansion. The danger of the occurrence of temperature-related deformations is thus additionally reduced.

In another advantageous development, provision is made for the surface of the top and/or bottom plate to be divided by additional membrane-like transitional parts into fields which are movable relatively to one another. In a similar construction, each of these fields can accommodate an independent tool. Even in the case of slightly varying heights, all of the individual tools have a uniform closing pressure applied to them.

In one equalizing plate of this kind it has proven to be especially advantageous if only one of the two plates has additional membrane-like transitions, and if the inner surface of the rigidly constructed opposite plate is so structured that in the rest position it is at a uniform distance from the inside of the flexible plate. The uniform spacing in a construction of this kind has the effect of an abutment in the case of local overstressing of such a plate. Particularly in the use of a plurality of tools, where the danger of the sticking of an individual tool can never be wholly avoided, damage to the tool or to the equalizing plate is advantageously forestalled. A spacing of less than about 2 mm has proven to be especially expedient, because in the event of such trouble the hydraulic forces that occur in the case of ordinary sizes of construction can easily be controlled.

In another development, provision is made for the membrane-like transition and the additional membrane-like transition or transitions to fit into in recesses in the opposite plate so as to be movable in the direction of press movement. This construction is especially advantageous whenever the equalizing plate has to withstand transverse forces in addition to the primary vertical forces. An application of this kind could be found where the equalizing plate is disposed vertically in a press.

In another desirable embodiment, provision is made for spring elements to be provided between the top and bottom plate, whereby the distance between the two plates at rest is equalized. By this construction the elastic properties of the membrane-like transition or transitions are enhanced.

In order to assure a uniform temperature of the equalizing plate in different states of operation, it has been found desirable for the bottom and or the top plate to contain a source of heat, for example in the form of a heating coil.

BRIEF DESCRIPTION OF THE DRAWINGS

The various embodiments of the invention are shown by way of example in the drawings as follows.

BRIEF DESCRIPTION OF THE INVENTION

A number of exemplary embodiments of the equalizing plate of the invention are represented in the appended drawing, and they are explained hereinbelow.

Figure 1:
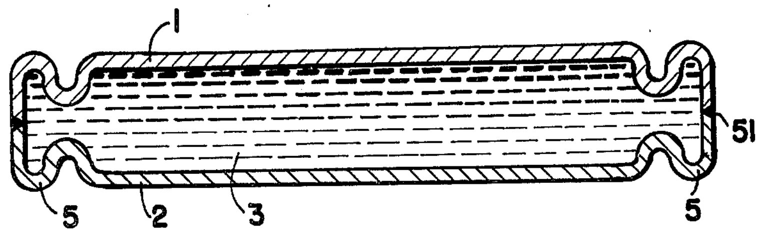
FIG. 1 is a cross-sectional view of a plate according to the present invention.

FIG. 1 shows an equalizing plate in which the top plate 1 and the bottom or base plate 2 are flexibly constructed in a mirror-image relationship. Both plates consist of deep-drawn sheet steel and they are joined together by a weld 51 in the outer rims of the membrane-like transition 5. The space between the two plates is filled with a hydraulic fluid 3.

Depending on the application, it may be desirable to place the hydraulic fluid under a static bias. Since the principle of operation of the equalizing plate of the invention is based essentially on the fact that the liquid cavity substantially preserves its volume under the conditions of operation, it may also be necessary in some cases to provide additional reinforcing elements, in the form, for example, of a banding, in the rim of the membrane-like transition 5, which is of no importance to the relative movement between the two plates. The construction represented in FIG. 1 is especially suitable for those applications in which the top plate 1 and the bottom plate 2 are subjected under operating conditions to constant deformations, and in which nevertheless a uniform closing force must be assured over the entire working depth. Such an application is to be seen, for example, in vulcanization presses in which a plurality of individual molds, distributed over a relatively large area, are used simultaneously. Depending on the kind of production, these molds usually differ in height, and this, aside from the deformations of the press itself, results in dimensional differences in the press parts. By the use of the equalizing plate of the invention, an equalized closing force is achieved for all of the molds used. Dimensional differences in the parts due to an unequalized closing force are hereby basically avoided.

With regard to the special hydraulic fluid 3 there are many different possibilities. In vulcanization presses the use of a molten low-melting point solder has proven excellent, because, in addition to good heat conductivity, it has a chemically neutral behavior at the temperatures involved. The equalizing plate of the invention can be disposed, in this kind of embodiment, between the heating units and the molds of the vulcanization press, and this will result in an excellent uniformity over the entire working surface, both as regards the mold temperatures and as regards the individual mold closing forces. The equalizing plate for these applications usually has a thickness of only about 10 to 15 mm, there being no technical difficulties involved in allowing for the elevated thermal expansion coefficient of the low-melting solder by proper construction of the membrane-like transition 5 and the proper design of the space between the top and bottom plates. The retrofitting of vulcanizing presses with the equalizing plate is for this reason possible in virtually all cases without any technical difficulty, and it is a mere matter of expediency whether the equalizing plate is installed in a particular case on the upper frame, on the lower frame, or on both frames.

Figure 2:
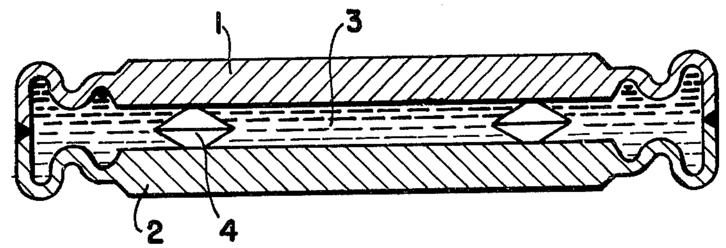
FIG. 2 is a cross-sectional view of a second embodiment of the plate.

FIG. 2 shows an alternative embodiment in which the top plate 1 and the bottom plate 2 are constructed in a relatively rigid manner. Such an embodiment is suitable especially for those applications in which no excessive deformation of the frames of the presses is anticipated, and in which a basically flat raw material is to be treated with pressure with the avoidance of deformations.

It is known, for example, that "keying" phenomena have often occurred in the removal of water from leather fiber materials in high-pressure presses. These phenomena have lead to considerable difficulty, especially in the fabrication of the boards. These difficulties are excluded by the use of the equalizing plate of the invention, and a considerable improvement of the thickness accuracy of the boards is achieved.

The top and bottom plate are joined together in FIG. 2 by additional spring elements 4. By this construction the assurance is given that when the plates are in the rest position they will always be spaced evenly apart. Particularly for the control of the closing speed, the assurance of such an equalized spacing of the press plates from one another is of great importance.

Figure 3:
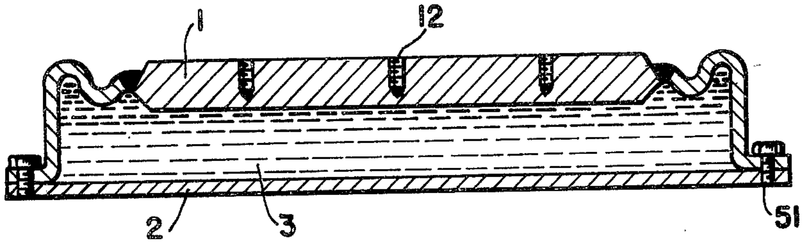
FIG. 3 is a cross-sectional view of a third embodiment of the plate.

FIG. 3 shows an alternative embodiment in which the top plate 1 has tapped holes 12 for the fixation of molds. The bottom plate 2 is of flexible construction and is connected to plate 1 by bolts 52. Such an embodiment is especially suitable for use in presses in which a strong dimensional deformation of the frames must be anticipated under operating conditions.

Figure 4:
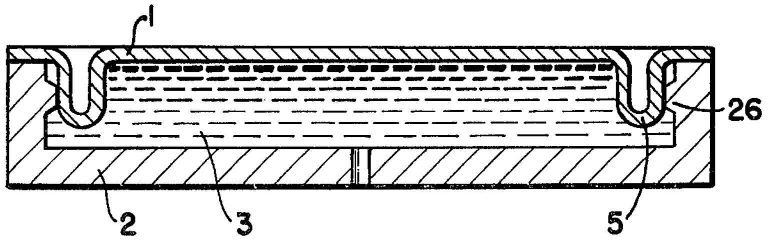
FIG. 4 is a cross-sectional view of a fourth embodiment of the plate.

FIG. 4 shows an embodiment of the equalizing plate of the invention, in which the flexibly constructed top plate 1 is guided by the laterally disposed membrane-like transition 5 in the lateral, circumferential bead 26 on the bottom plate. This embodiment results in considerabe advantages with regard to the transverse stability of the top plate 1 with respect to the bottom plate 2, and an equalizing plate constructed in this manner can be used in a vertical arrangement, for example in a filter press.

Figure 5:
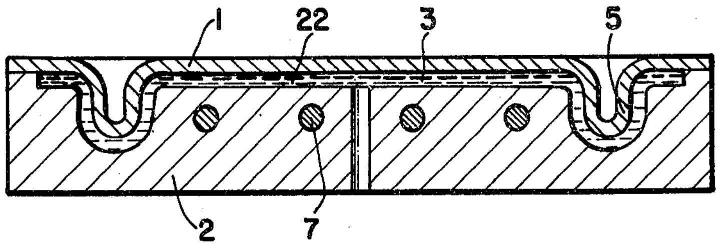
FIG. 5 is a cross-sectional view of a fifth embodiment of the plate.

FIG. 5 shows a similar embodiment in which, however, the bottom plate is so structured that its upper side is at a constant distance 22 from the bottom of the top plate 1. In the projections of the bottom plate 2, heating rods 7 are disposed. The temperature of the top plate can be controlled in an especially sensitive manner by such means. In addition, the relative position of the top plate can be predetermined very precisely.

Figure 6:
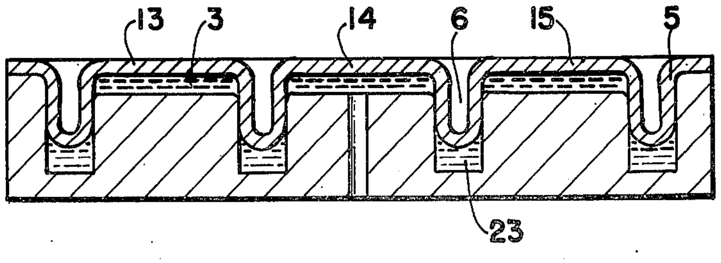
FIG. 6 is a cross-sectional view of a sixth embodiment of the plate.

FIG. 6 shows an equalizing plate in which projections 6 are provided on the flexible top plate 1, which are inserted into recesses 23 such that the top plate is movable only in the vertical direction. If the projections 6 are constructed in a similar embodiment as folds, the special advantage will be that the various fields 13, 14 and 15 are movable upwardly and downwardly independently of one another. Depending on the special construction, this will result in the possibility of disposing an independent tool on each of these fields. A height difference up to a maximum of about ±0.5 mm from field to field can be achieved easily by such a configuration.

It has been found especially advantageous with regard to practical problems in vulcanizing presses for the vertical spacing between the bottom plate 2 and the top plate 1 to be uniform and correspond approximately to the maximum difference in height of the simultaneously used tools.

In the presses commonly used, a value of less than about 2mm, has proven advantageous. By this special measure, the assurance is especially provided that damage is prevented in the event of any local overstressing of the equalizing plate of the invention, by the shifting of a tool, for example.

The special advantage of the equalizing plate of the invention consists in the fact that it can be used directly in virtually all existing presses, due to its simple construction. In virtually all applications, its use offers an immediate measure improvement in the products with regard to their dimensional tolerances. Even after long use, the equalizing plate has shown no deformation or damage so that it can be considered to be extraordinarily reliable in operation.

It will be appreciated that the instant specification and claims are set forth by way of illustration and not limitation, and that various modifications and changes may be made without departing from the spirit and scope of the present invention.

What is claimed is:

1. An equalizing platen for use in a vulcanizing press or the like comprising: a base plate, a top plate, a low-melting point metal alloy disposed therebetween and means flexibly joining the two plates together at their outer periphery to hermetically seal the alloy, and wherein at least one of the plates has a flexible membrane-like transition in the outer periphery thereof having at least one single U-shaped profile whose axis of symmetry is perpendicular to the surface of one of said plates.

2. The equalizing platen according to claim 1, further comprising spring elements disposed between the two plates, by which the spacing at rest of the two plates is equalized.

3. The equalizing platen according to claim 1, wherein at least one of the two plates comprises a stiff and inflexible construction.

4. The equalizing platen according to claim 1, further comprising a heat source in at least one of the plates.

5. The equalizing platen according to claim 4, wherein the heat source comprises a heating coil.

6. The equalizing platen according to claim 1 or 3, wherein the surface of at least one of the plates is divided into relatively movable fields by additional flexible membrane-like transitions.

7. The equalizing platen according to claim 6, wherein only one of the two plates has additional membrane-like transitions, and that the inner surface of the other stiffly constructed plate is so structured that, in the rest position, it has a uniform spacing from the inside of the flexible plate.

8. The equalizing platen according to claim 7, wherein the spacing is less than about 2 mm.

9. The equalizing platen according to claim 7, wherein the other plate has recesses therein and the membrane-like transition and the additional membrane-like transistions are mounted for movement in the direction of movement in the recesses.

* * * * *